United States Patent [19]

Stricker

[11] Patent Number: 4,599,041
[45] Date of Patent: Jul. 8, 1986

[54] VARIABLE CAMBER TANDEM BLADE BOW FOR TURBOMACHINES

[76] Inventor: John G. Stricker, 871 Highland Ave., Annapolis, Md. 21403

[21] Appl. No.: 683,448

[22] Filed: Dec. 19, 1984

[51] Int. Cl.⁴ ............................................. F04D 29/36
[52] U.S. Cl. ............................... 415/130; 415/149 A; 416/127; 416/231 B; 416/DIG. 5
[58] Field of Search ....................... 416/200 R–200A, 416/231 B, DIG. 5, 127, 130, 223 A; 415/130, 129, 149 A

[56] References Cited

U.S. PATENT DOCUMENTS

| | | | |
|---|---|---|---|
| 2,314,572 | 2/1943 | Chitz | 415/129 |
| 2,407,630 | 9/1946 | Dewan | 415/130 |
| 2,805,818 | 9/1957 | Ferri | 415/148 |
| 2,982,361 | 5/1961 | Rosen | 416/127 X |
| 3,032,119 | 5/1962 | Hachmann | 416/200 A |
| 3,075,743 | 1/1963 | Sheets | 416/231 B X |
| 3,153,454 | 10/1964 | Gaubis | 416/127 |
| 3,442,493 | 5/1969 | Smith, Jr. | 415/164 |
| 3,867,062 | 2/1975 | Troller | 416/200 A X |
| 3,946,554 | 3/1976 | Neumann | 60/204 |
| 3,986,794 | 10/1976 | Korn | 415/129 |
| 4,313,711 | 2/1982 | Lee | 416/231 B |
| 4,483,658 | 11/1984 | Levine | 416/200 R X |
| 4,483,659 | 11/1984 | Armstrong | 415/181 X |
| 4,533,292 | 8/1985 | Sugihara et al. | 415/149 A |
| 4,545,726 | 10/1985 | Holliger | 416/223 A |

FOREIGN PATENT DOCUMENTS

| | | | |
|---|---|---|---|
| 1503647 | 3/1969 | Fed. Rep. of Germany | 416/130 |
| 1181926 | 6/1959 | France | 415/130 |
| 146276 | 11/1980 | Japan | 416/130 |
| 251987 | 9/1948 | Switzerland | 416/200 A |
| 1278825 | 6/1972 | United Kingdom | 416/160 |
| 274302 | 6/1970 | U.S.S.R. | 416/207 |

Primary Examiner—Everette A. Powell, Jr.
Attorney, Agent, or Firm—Luther A. Marsh; Roger L. Maxwell

[57] ABSTRACT

Multiple flat-plate blade rows of pitch adjustable blades are offset mounted in a manner such that when flat-plate blades in adjacent rows are aligned at a specific pitch setting, respective flat-plate blades of the adjacent rows nearly mate. The offset between the flat-plate blade rows functions to produce unequal pitch angle settings of the blades of adjacent rows which, in turn, function to produce the result that the respective flat-plate blades which nearly mate, in combination, produce a blade configuration which has an effective camber.

12 Claims, 7 Drawing Figures

VARIABLE CAMBER TANDEM BLADE BOW FOR TURBOMACHINES

The invention described herein may be manufactured and used by or for the Government of the United States of America for governmental purposes without the payment of any royalties thereon or therefore.

BACKGROUND OF THE INVENTION

1. Field of the Invention

This invention relates generally to variable pitch, flat-plate blade rows for turbomachinery, and more particularly, to variable pitch, offset multiple flat-plate blade rows for bidirectional thrust or flow devices which effectively provide variable camber blade row configurations.

2. Description of the Prior Art

Variable pitch, flat-plate blade rows are commonly used in applications where bidirectional thrust or flow is required. One such application is bow or stern bidirectional thrusters installed on naval ships to provide a turning capability independent of the ship's main propulsion and steering systems. Another application is in certain blower and air distribution duct systems where bidirectional air flow is required.

Conventional bidirectional variable pitch flat-blade row thrust or flow devices are low rotational speed units which are large and heavy. Such devices may be driven at constant or variable rotational speeds, but the direction of rotation need not be reversed to produce bidirectional thrust or flow, thereby simplifying the power transmission system thereof. A flat-plate or uncambered geometry of the blade rows provides the capability of reversing the direction of the thrust or flow without reversing the direction of rotation of the mounting hub holding the blade rows. This flat-plate or uncambered blade geometry also ensures that substantially equivalent performance characteristics, i.e., thrust or flow, are produced in either direction. The measure of useful work output, i.e., thrust or flow, produced by conventional bidirectional thrust or flow devices is determined by the total turning angle through which the working fluid flow is directed. Flat-plate or uncambered blade rows are dependent solely upon the incidence angle of the approaching relative fluid velocity to generate this total angle since the blade curvature of the rows is zero, i.e., uncambered, with larger relative working fluid velocity incidence angles required to generate greater total turning angles of the working fluid to increase the performance of these conventional bidirectional thrust or flow devices. The incidence angle of the approaching relative fluid velocity is in turn determined by the pitch angle setting of the flat-plate or uncambered blade rows. The efficiency of conventional bidirectional variable pitch flat-plate blade row thrust or flow devices, however, is limited by the flat-plate geometry of the blade rows. Conventional designs for such devices have generally been limited to single-row, lightly loaded blades having limited pitch angle setting ranges since cavitation, i.e., the phenomenon wherein vapor bubbles are formed at the inlet of the device due to the net positive suction head being less than the vapor pressure of the fluid, and subsequently collapse violently at some point downstream of the inlet, producing very sharp, crackling noises, frequently accompanied by physical damage to adjacent metal surfaces, and flow separation, i.e., the phenomenon wherein flow path of the working fluid separates from the uncambered blade surface, impose limiting restrictions on allowable flow incidence angles of the relative fluid flow.

A conventional, bidirectional pump, blower, or fan 10 design comprising a variable pitch, single flat-plate or uncambered blade row 12 is depicted in FIGS. 1(a) and 1(b) and 1(c). The variable pitch, single blade row 12 is comprised of a plurality of flat-plate or uncambered blades 14 mounted along the centerline of rotatable hub 16 by pivotal attaching means 18. These elements are rotatably disposed within a casing or duct 20 by means of nonflow interfering stationary hubs 22 rigidly secured to casing 20 by guide vane struts 24. These guide vane struts 24 also function to direct the working fluid flow 26a or 26b onto the plurality of uncambered blades 14 of the variable pitch single blade row 12. A rotating mechanism (not shown) cooperates with the rotatable hub 16 for rotation thereof, as shown in FIG. 1(a) in the direction of arrow 28.

The modulation of the thrust or flow rate developed by this conventional, bidirectional pump, blower, or fan 10, either in direction or absolute magnitude, without changing the direction of rotation of the rotatable hub 16 or the rotational speed thereof, is accomplished by varying the pitch angle $\theta$ of the plurality of uncambered blades 14 about the pivotal attaching means 18. A hub-mounted adjustment mechanism (not shown) cooperates with the pivotal attaching means 18 of each of the plurality of uncambered blades 14 to vary the pitch angle $\theta$ thereof, thereby varying the magnitude of the thrust of flow, and/or the direction thereof. The settings of the pitch angle $\theta$ of the plurality uncambered blades 14 is referenced to a tangential direction 30, which is parallel to the direction of rotation 28 and perpendicular to the direction of the working fluid flow 26a or 26b, and a chordline 29 of the uncambered blades 14. The pitch angle $\theta$ is conventionally varied between zero degrees, i.e., the chordlines 29 of the plurality of uncambered blades 14 lying parallel to the tangential direction 30, a minimum (negative) pitch angle $-\theta$ as depicted in FIG. 1(b), and a maximum (positive) pitch angle $+\theta$ as depicted in FIG. 1(c). When the pitch angle $\theta$ of the plurality of uncambered blades 14 is set at zero degrees, no thrust of flow is produced by the conventional bidirectional pump, blower, or fan 10. When the pitch angle $\theta$ is set at $-\theta$ or $+\theta$, depending upon the direction of the working fluid flow 26a or 26b, maximum thrust or fluid flow is produced. Varying the setting of pitch angle $\theta$ of the plurality of uncambered blades 14 between zero degrees and the minimum (negative) pitch angle $-\theta$ (or the maximum (positive) pitch angle $+\theta$) by means of the hub-mounted adjustment mechanism (not shown), the magnitude of the thrust of fluid flow in a given direction is modulated without changing the rotational speed of the rotatable hub 16. Likewise, by varying the pitch angle $\theta$ of the plurality of uncambered blades 14 to crossover from a positive pitch angle to a negative pitch angle, or vice versa, the direction of the thrust or flow develop by the conventional bidirectional pump, blower, or fan 10 is reversed. These conventional bidirectional pumps, blowers, and fans, however, are limited as to the maximum (positive) pitch angle $+\theta$ and minimum (negative) pitch angle $-\theta$ at which the plurality of uncambered blades 14 may be set, and hence in the magnitude of thrust or fluid flow developed thereby, because once the maximum or minimum pitch angle setting is exceeded, cavitation and/or flow separation occurs and pump 10 performance deteriorates.

The prior art is replete with disclosures of blade row designs for use with thrust or flow devices. Representative references are U.S. Pat. Nos. 3,986,794 to Korn, 3,946,554 to Neumann, 3,442,493 to Smith. Jr., 2,805,818 to Ferri, and 2,314,572 to Chitz (Sheets). Smith, Jr. teaches static, cambered rotor vanes, Chitz teaches cambered blades having slots therein, Ferri teaches cambered rotor vanes succeeded by rotatable, cambered stator blades, Neumann teaches pitch adjustable cambered fan blades, and Korn teaches pitch adjustable cambered vanes. Each of these references, however, suffers from the inherent deficiency of cambered vanes so that even though the vanes may be pitch adjusted, the camber of the vanes causes unequal thrust or fluid flow performance characteristics at varied pitch settings, therefore making the vanes and blades as disclosed by these references inappropriate for bidirectional pumps, blowers, or fans. Korn discloses cambered vanes which can be pitch adjusted for forward thrust in a manner such that a vane from a second row abuts a succeeding vane in a third row to form a first cambered vane, and these vanes can also be pitch adjusted for reverse thrust in a manner such that the same vane from the second row abuts a succeeding vane in a first row to form a second cambered vane. Even though Korn discloses a mechanism which can form cambered vane rows for producing forward and reverse thrust, the camber of these vanes in the forward and reverse configurations is significantly different, thereby producing different thrust forces in the forward and reverse configurations. Moreover, the reverse thrust configuration of the vanes is only intended to be operational for short durations during engine operation, approximately 1% or less of the total engine operating time. As discussed hereinabove, bidirectional thrust or flow devices must be capable of developing substantially equivalent thrust or flow performance characteristics in either direction, inasmuch as an effective bow or stern bidirectional thruster, for example, must be capable of effectively turning a ship either direction with equal facility.

SUMMARY OF THE INVENTION

Accordingly, to overcome the inherent deficiencies of prior art bidirectional thrust or flow devices, a primary object of the present invention is to provide a variable pitch, variable camber offset multiple flat-plate blade row configuration for bidirectional thrust or flow devices which produces significantly greater working fluid turning angles, i.e., greater thrust or fluid flow, in both fluid flow directions before encountering cavitation and/or fluid flow separations limits.

Another object of the present invention is to provide a variable pitch, variable camber offset multiple flat-plate blade row configuration for bidirectional thrust or flow devices which provides fluid flow boundary layer energization of the working fluid passing between blade rows, thereby enhancing the performance characteristics of the bidirectional thrust or flow device.

Yet another object of the present invention is to provide a variable pitch, variable camber offset multiple flat-plate blade row configuration for bidirectional thrust or flow which reduces blade cavitation with respect to depth or net positive suction head required, thereby permitting efficacious operation of the bidirectional thrust or flow devices at reduced submergence depths or suction pressures.

Still another object of the present invention is to provide a variable pitch, variable camber offset multiple flat-plate blade row configuration for bidirectional thrust or flow devices which can produce a predetermined thrust or flow at a reduced incidence angle of the working fluid flow, thereby reducing the required input power to produce the predetermined thrust or fluid flow, or alternately producing an increased thrust or fluid flow for a predetermined power input.

Yet one more object of the present invention is to provide a variable pitch, variable camber offset multiple flat-plate blade row configuration for bidirectional thrust or flow devices such that the overall dimensions and weight thereof is significantly reduced through reduction of blade row tip diameters and increasing shaft and blade tip rotational speeds.

Summarily, these and other objects of the present invention are attained by multiple flat-plate blade rows of pitch adjustable blades. These multiple blade rows are offset mounted on a rotating hub in a matter such that when flat-plate blades in adjacent rows are aligned at a specific pitch setting, respective flat-plate blades of the adjacent rows nearly mate, i.e., there is a small gap between the trailing edge of the flat-plate blade in the first row and the leading edge of the flat-plate blade in the second row, and so forth for multiple blade row configurations having more than two blade rows. The offset between the flat-plate blade rows functions to produce unequal pitch angle settings between the flat-plate blades of the first row and the flat-plate blades of the second row. The unequal pitch angle settings of the flat-plate blades of adjacent rows functions to produce the result that the respective flat-plate blades which nearly mate, in combination produce a blade configuration which has an effective camber. Therefore, the total working fluid turning angle passing through adjacent blade rows is the sum of the incidence angle of the approaching relative working fluid flow and the absolute magnitude of the difference between the pitch angle settings of the flat-plate blades of adjacent rows, i.e., the effective camber of the respective blades in combination.

The small gap between the nearly mated respective flat-plate blades of adjacent rows functions to produce boundary layer energization for the working fluid flow passing over the leading portion of the trailing blade row.

BRIEF DESCRIPTION OF THE DRAWINGS

A more complete understanding of the present invention and the attendant advantages and features thereof will be more readily appreciated as the same becomes better understood by reference to the following detailed description when considered in conjunction with the following drawings wherein.

DETAILED DESCRIPTION OF THE PREFERRED EMBODIMENTS

Figure 1A:
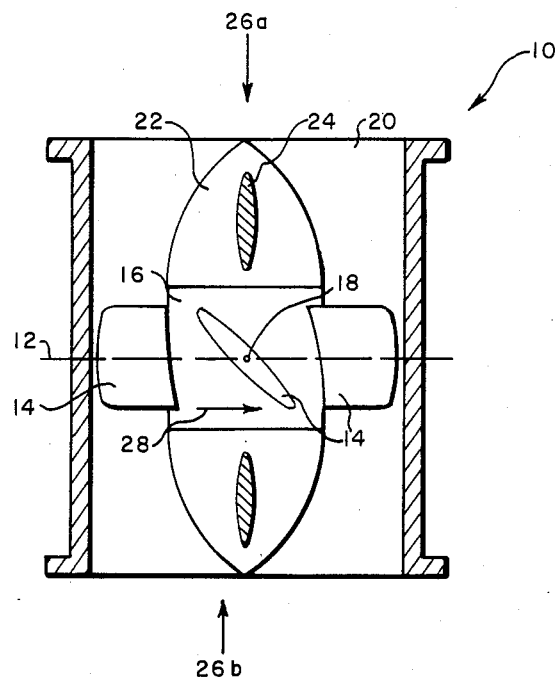
FIG. 1(a) is a cross sectional view of a variable pitch, single flat-plate blade row of a conventional, bidirectional pump, blower, or fan.
Figure 1B:
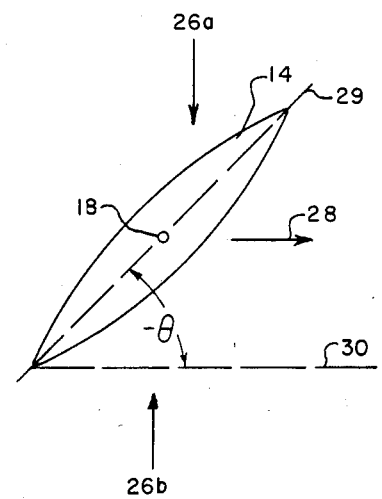
FIG. 1(b) depicts a single flat-plate blade of the device of FIG. 1(a) in a minimum (negative) pitch position.
Figure 1C:
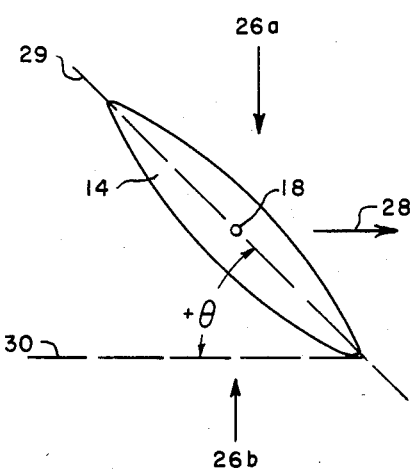
FIG. 1(c) depicts a single flat-plate blade of the device of FIG. 1(a) in a maximum (positive) pitch position.
Figure 2:
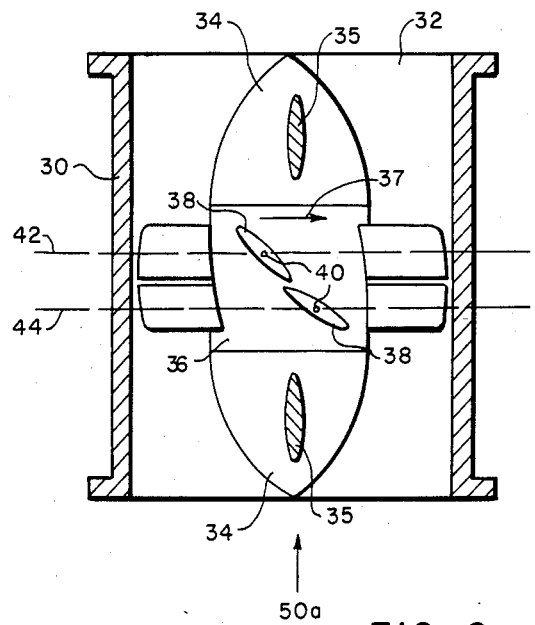
FIG. 2 is a cross sectional view of a variable pitch, variable camber offset multiple flat-plate blade row bidirectional thrust or flow device according to the present invention.

Referring now to the drawings wherein like reference numerals designate like or corresponding elements throughout the several views, there is shown generally in FIG. 2 a variable pitch, variable camber offset multiple flat-plate blade row bidirectional thrust or flow device 30 with a cylindrical casing or duct 32. Non-flow interfering stationary hubs 34 are rigidly mounted to the inner periphery of the cylindrical casing 32 by guide vane struts 35 and function as a means for rotatably mounting a rotating hub 36 within the interior of the casing 32. Since the bidirectional thrust or flow device 30 modulates the magnitude of the thrust or working fluid flow, or reverses the direction thereof, by varying the pitch angles of the blades, the rotating hub 36 is only required to rotate in one direction, as shown in FIG. 2 by arrow 37. This functional configuration greatly simplifies the power transmission train required for the thrust or flow device 30. A rotating drive mechanism (not shown) cooperates with the rotating hub 36 by means of a shaft (not shown) or other equivalent drive mechanism, for rotation of the rotating hub 36.

A plurality of blades 38 are mounted on the rotating hub 36 by means of pivotal attaching means 40 in a manner such that multiple offset blade rows are formed and so that the means 40 of a given blade row lie in a common plane. A tandem blade row configuration is depicted in the preferred embodiment of FIG. 2, i.e., a first blade row 42 and a second blade row 44 are mounted on rotating hub 36. The plurality of blades 38 forming the first and second blade rows 42, 44 have a flat-plate or uncambered geometry, as can be more clearly seen by reference to FIG. 3. An uncambered or flatplate blade configuration is one wherein the camber line of any section of a given blade 38 coincides with a chord line 46, i.e., the straight line joining the centers of curvature of the leading and trailing edges of the section of the blade 38. This flat-plate or uncambered blade geometry ensures that substantially equivalent thrust or fluid flow is produced in either direction by the bidirectional thrust or flow device 30. Guide vane struts 35 are affixed to the non-flow interfering hubs 34 and also function to direct a working fluid flow onto the plurality of blades 38 mounted on the rotating hub 36.

Figure 3:
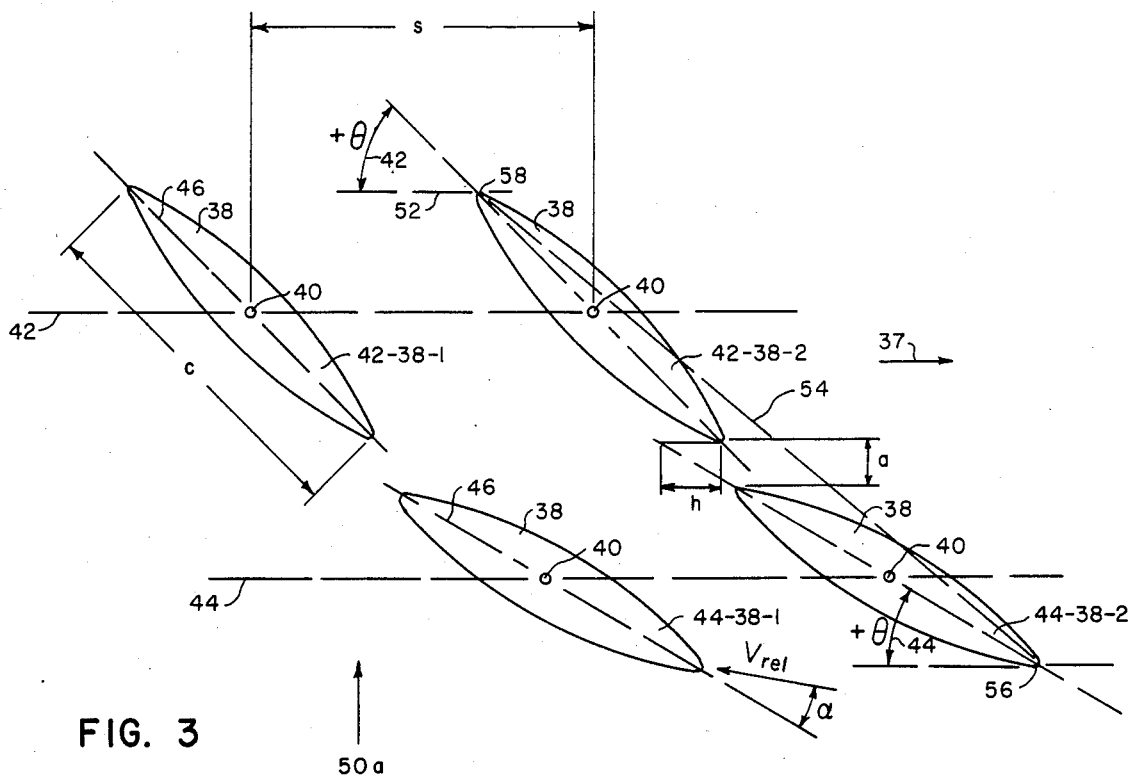
FIG. 3 depicts the configuration of respective flat-plate blades of adjacent flat-plate blade rows according to the present invention when aligned in a maximum (positive) pitch setting which produces maximum thrust or flow in a first direction.
Figure 4:
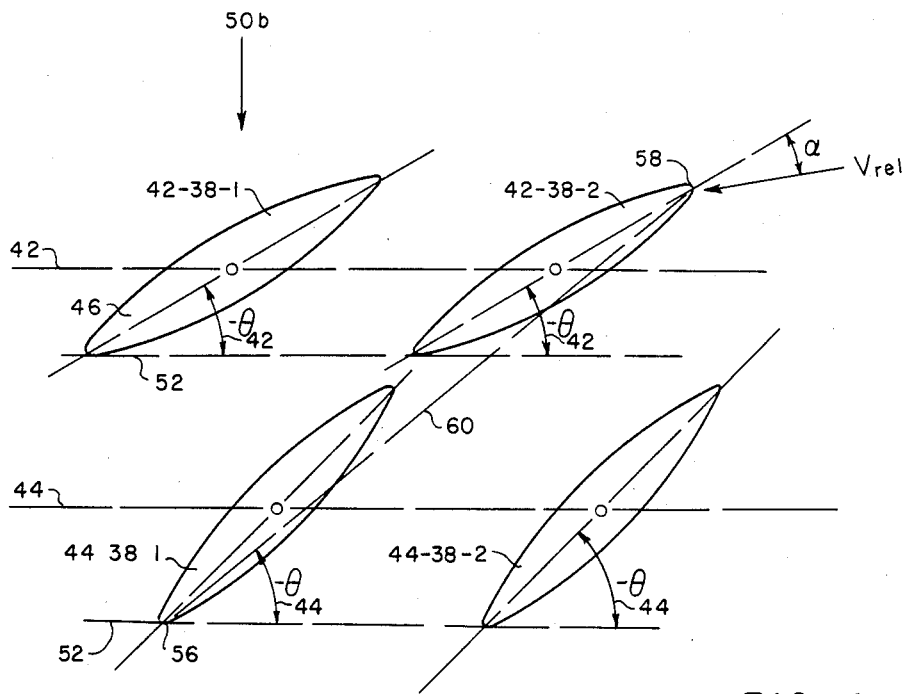
FIG. 4 depicts the configuration of respective flat-plate blades of adjacent flat-plate blade rows according to the present invention when aligned in a minimum (negative) pitch setting which produces maximum thrust or flow in a second direction.

The preferred embodiment as depicted in FIGS. 2, 3 and 4 is a tandem blade row configuration, i.e., first and second blade rows 42, 44. It is to be understood that this is by way of illustration only of the elements and functioning of the bidirectional thrust or flow device 30 according to the present invention and is not intended to limit the scope thereof. More than two offset blade rows are considered to be within the scope of the present invention, the tandem row 42, 44 configuration being depicted herein to simplify the ensuing descriptions.

Representative blades 38 of the plurality of blades 38 of the first and second blade rows 42, 44 are shown in FIG. 3 in the maximum positive pitch configuration which produces a maximum thrust or flow in the direction of arrow 50a. A hub-mounted adjusting means (not shown) cooperates with each of the pivotal attaching means 40 of each of the plurality of uncambered blades 38 to vary a pitch angle $\theta$ thereof. The hub-mounted adjusting means may be either of such configuration that it varies the pitch angles $\theta$ of all of the plurality of blades 38 of the first and second blade rows 42, 44 simultaneously, or of such configuration that the pitch angles $\theta$ of the plurality of blades 38 of each blade row, i.e., first blade row 42 and second blade row 44, are varied by blade row. A tangential reference line 52, parallel to the direction of rotation 37 of the plurality of blades 38 are perpendicular to the approaching flow direction of the working fluid 50a or 50b, is defined so as to function as a reference line for measuring the pitch angles $\theta$ of the plurality of blades 38. For ease of explanation, the plurality of blades 38 of the first blade and second blade rows 42, 44, as depicted in FIGS. 3 and 4, have been designated as 42-38-1, 42-38-2, 44-38-1, and 44-38-2, respectively.

The plurality of blades 38 of the first and second blade rows 42, 44 are offset as shown and cooperate with the hub-mounted adjusting means (not shown) through respective pivotal attaching means 40 in a manner such that at all pitch angle $\theta$ settings, except one, the pitch angles $\pm \theta_{42}$ of the plurality of blades 38 of the first blade row 42 are unequal to the pitch angle $\pm \theta_{44}$ of the plurality of blades 38 of the second blade row 44, i.e., $\theta_{42} \neq \theta_{44}$. The one exception, present only with certain actuating mechanisms, is when the chord lines 46 of the plurality of blades 38 of the first and second blade rows 42, 44 are aligned parallel to the tangential reference line 52 in which case pitch angle $\theta_{42} = \theta_{44} = 0°$. In such cases, zero thrust or fluid flow is produced by the bidirectional thrust or flow device 30. Since, with the exception of a zero degrees pitch angle setting with certain actuating mechanisms, the pitch angles $\pm \theta_{42}$ of the plurality of blades 38 of the first blade row 42 are unequal to the pitch angles $\pm \theta_{44}$ of the plurality of blades 38 of the second blade row 44, respective uncambered blades 38 of the first and second blade rows 42, 44, in combination, form an effective cambered blade configuration as will be described hereinbelow.

When blades 42-38-1, 42-38-2, 44-38-1, and 42-38-2 are aligned in the maximum positive pitch angle configuration, as shown in FIG. 3, blades 42-38-1 and 42-38-2 are at maximum positive pitch angle $+\theta_{42}$ with respect to tangential reference line 52 and blades 44-38-1 and 44-38-2 are at a maximum positive pitch angle $+\theta_{44}$ with respect to tangential reference line 52. Furthermore, as noted hereinbefore, maximum positive pitch angle $+\theta_{42}$ is unequal to maximum positive pitch angle $+\theta_{44}$, i.e., $+\theta_{42} \neq +\theta_{44}$. In this maximum positive pitch angle configuration of first and second blade rows 42, 44, blade 42-38-1 of the first blade row 42 nearly mates with blade 44-38-1 of the second blade 44 to define an energization slot herebetween, and blade 42-38-2 of the first blade row 42 nearly mates with blade 44-38-2 of the second blade row 44 to define an energization slot therebetween. Other respective blades 38 of the first and second bade rows 42, 44 nearly mate in the same manner. Thus, an effective chord line 54 is defined between the leading edge 56 of blade 44-38-2 and the trailing edge 58 of blade 42-38-2. Other respective blades 38 of the first and second blade rows 42, 44 likewise have defined an effective chord line 54. Since camber is defined as the curvature of the centerline of an airfoil or blade section relative to a chord line thereof, uncambered or flat-plate blades 42-38-2 and 44-38-2, in combination, form a cambered blade configuration with respect to effective chord line 54. Similarly, respective blade pairs in the first and second blade rows 42, 44 of the bidirectional thrust or flow device 30, as described hereinabove, e.g., blade 42-38-1 in combination with blade 44-38-1, define effective chord lines 54, and therefore, form cambered blade configurations.

In a similar manner, when blades 42-38-1, 42-38-2, 44-38-1, and 44-38-2 are aligned in a minimum (negative) pitch configuration, as shown in FIG. 4, blades 42-38-1 and 42-38-2 are at a minimum (negative) pitch angle $-\theta_{42}$ with respect to the tangential reference line 52 and blades 44-38-1 and 44-38-2 are at a minimum (negative) pitch angle $-\theta_{44}$. And as noted hereinabove, minimum (negative) pitch angle $-\theta_{42}$ is unequal to minimum (negative) pitch angle $-\theta_{44}$, i.e., $-\theta_{42} \neq -\theta_{44}$, except with certain actuating mechanisms when the pitch setting is zero degrees, i.e., $\theta_{42} = \theta_{44} = 0°$. In the minimum (negative) pitch angle configuration, blade 42-38-2 of the first blade row 42 nearly mates with blade 44-38-1 of the second blade row 44, and respective blades 38 of the first and second rows 42, 44 nearly mate in a like manner as described hereinabove. Thus, an effective chord line 60 is defined between the what is now the leading edge 58 of blade 42-38-2 and what is now the trailing edge 56 of blade 44-38-1. Therefore, blades 42-38-2 and 44-38-1, in combination, form a cambered blade configuration with respect to effective chord line 60. In a similar manner, other respective blade pairs of the first and second blade rows 42, 44, in combination, define effective chord lines 60, and therefore form cambered blade configurations.

The maximum (positive) pitch angle $+\theta_{42}$ of the first blade row 42 as shown in FIG. 3 is equal in absolute magnitude to the minimum (negative) pitch angle $-\theta_{42}$ of the first blade row 42 as shown in FIG. 4, and likewise, the maximum (positive) pitch angle $+\theta_{44}$ of the second blade row 44 as shown in FIG. 3 is equal in absolute magnitude to the minimum (negative) pitch angle $-\theta_{44}$ of the second blade row 44 as shown in FIG. 4. When the pitch angle settings of the first and second blade rows 42, 44 are set at less than the maximum or minimum pitch angle settings, the above hereinabove described relationships govern. These relationships ensure that substantially equivalent thrust or fluid flow is produced by the bidirectional thrust or flow device 30 according to the present invention in either working fluid flow direction 50a or 50b.

The modulation of the magnitude of the thrust or fluid flow developed by the bidirectional thrust or flow device 30, or the reversal of the directional thereof, is accomplished in a manner similar to conventional, bidirectional pumps, blowers, or fans as described in the "Background of the Invention" section.

The incidence angle $\alpha$, as shown in FIGS. 3 and 4, is an angular measurement defining the angle between the relative working fluid velocity, Vrel, and blades 44-38-2, 42-38-2, respectively. As described hereinabove in the "Background of the Invention" section, the incidence angle $\alpha$ of Vrel is the sole factor in determining the total turning angle through which the fluid is directed in conventional bidirectional thrust or flow devices, with this incidence angle being determined by the pitch angle setting of the uncambered blades. And as further noted hereinabove, the pitch angle setting range has been narrowly limited due to cavitation and/or flow separation problems. Therefore, since the incidence angle $\alpha$ of Vrel, and therefore the total turning angle of the working fluid, has been limited by this inherent deficiency, the useful work output, i.e., thrust or flow, of conventional bidirectional thrust or flow devices has been limited.

The bidirectional thrust or flow device 30 according to the present invention, however, is not limited to the incidence angle of Vrel as the sole means determining the total turning angle through which the working fluid is directed. Due to the effective chord lines 54 or 60 defined between the respective blades 38 of the first and second blade rows 42, 44, i.e., blades 42-38-1 and 44-38-1 in combination, or blades 42-38-2 and 44-38-1 in combination, the respective blades 38 of the first and second rows 42, 44 form cambered blade configurations which contribute to the total turning angle of the working fluid, and therefore to the useful work output, i.e., thrust or fluid flow, developed by the bidirectional thrust or flow device 30 according to the present invention. The contribution to the total turning angle produced by the cambered blade configurations as described hereinabove is the absolute magnitude of the difference between the pitch angle $\pm\theta_{42}$ of the plurality of blades 38 of the first blade row 42 and the pitch angle $\pm\theta_{44}$ of the plurality of blades 38 of the second blade row 44. Therefore, the useful work output, as defined by the total turning angle of the working fluid, produced by the bidirectional thrust or flow device 30 according to the present invention is:

TOTAL TURNING
ANGLE = $\alpha + |(\pm\theta_{42}) - (\pm\theta_{44})|$

Conventional prior art bidirectional thrust or flow devices lack the component $|(\pm\theta_{42}) - (\pm\theta_{44})|$ provided by the cambered blade configurations of the present invention. Therefore, by offset mounting of the plurality of blades 38 of the first blade row 42 with respect to the plurality of blades 38 of the second blade row, thereby defining effective chord lines 54 or 60 so that respective blades of blade rows 42, 44 form cambered blade configurations, the bidirectional thrust or flow device 30 according to the present invention incrementally increases the total turning angle, i.e., useful work output, of the present invention by the factor $|(\pm\theta_{42}) - (\pm\theta_{44})|$ while at the same time maintaining the incidence angle $\theta$ within a performance limit so that cavitation and/or flow separation does not occur.

Referring again to FIG. 3, physical parameters relating to the spacing intervals between respective blades of the first and second blade rows 42, 44, e.g., the nearly mated configuration of blades 42-38-2 and 44-38-2, are described with respect to their function in providing boundary layer energization. Boundary layer energization is the phenomenon whereby energy is added to the fluid as it passes from the surfaces of the plurality of blades 38 in the second blade row 44 to the surfaces of the plurality of of blades 38 in the first blade row. By adding energy to the working fluid as it transits from the blades 38 of the second blade row 44 to the blades 38 of the first blade row 42, the tendency for stall or flow separation from the surfaces of the blades 38 of the first blade row 42 is reduced, thereby increasing the efficiency or useful work output of the bidirectional thrust or flow device 30 according to the present invention. It is to be understood that this boundary layer energization phenomenon is equally applicable to the blade configuration depicted in FIG. 4, except that the tendency for stall or flow separation from the surfaces of the blades 38 of the second blade 44 is reduced.

Reference symbol s defines the spacing between adjacent blades of a given blade row, for example, as shown in FIG. 3, between blade 42-38-1 and 42-38-2. Reference symbol c defines the length of chordlines 46. Reference symbol a defines the blade edge separation in the axial direction between the respective blades 38 of the first and second blade rows 42, 44 which are in the nearly mated configuration. As shown in FIG. 3, a is the axial blade edge separation between the trailing blade edge of blade 44-38-2 and the leading blade edge of blade 42-38-2. Reference symbol h defines a tangential separation distance, parallel to the tangential reference line 52 between the respective blades 38 of the first and second blade rows 42, 44 which are in the nearly mated configuration. As shown in FIG. 3, h represents the tangential separation distance defined by tangentially extending a line from the leading blade edge of blade 42-38-2 until it intersects the chord line 46 or c extending from blade 44-38-2.

As noted hereinbefore, the pitch angle settings of the first and second blade rows 42, 44 may be varied between zero degrees and the maximum (positive) pitch angle $+\theta_{42}$, $+\theta_{44}$, respectively. At any intermediate pitch angle angle, $\theta_{42}$, $\theta_{44}$, respective blades 38 of the first and second blade rows 42, 44 will have a nearly mated configuration, with defined values for h and a. At the maximum (positive) pitch angle setting, i.e., $+\theta_{42}$, $+\theta_{44}$, the values of h and a will have predetermined minimum values, depending upon the offset mounting of the first blade row 42 with respect to the second blade row 44, and as the pitch angle settings of the first and second blade rows are reduced towards zero degrees, the value of h will approach infinity while the value of a approaches the axial separation distance 62, axial separation distance 62 being the axial distance between the plane of the pivotal attaching means 40 of the plurality of blades 38 of the first blade row 42 and the plane of the pivotal attaching means 40 of the plurality of blades 38 of the second blade row 44.

The performance limits of the bidirectional thrust or flow device 30 according to the present invention becomes critical, i.e., the tendency for cavitation or flow separation to occur, only at the extreme pitch angle settings of the plurality of blades 38, i.e., $\pm\theta_{42}$, $\pm\theta_{44}$. It has been determined that optimum values for the parameters h/s and a/c ensure boundary layer energization of the working fluid as it transits from the surfaces of the upstream plurality of blades 38 to the surfaces of the downstream plurality of blades 38, thus preventing the occurrence of flow separation or cavitation, thereby increasing the efficiency or useful work output of the bidirectional thrust or flow device 30 according to the present invention. The parameter h/s should have an optimum range value of 0.20 to 0.15 at the maximum (positive) and minimum (negative) pitch angles, $+\theta_{42}$, $+\theta_{44}$, and $-\theta_{42}$, $-\theta_{44}$, respectively, and the parameter a/c should be approximately zero, i.e., an extremely small value, at the maximum (positive) and minimum (negative) pitch angles, $+\theta_{42}$, $+\theta_{44}$, and $-\theta_{42}$, $-\theta_{44}$, respectively, for an optimized design for a bidirectional thrust or flow device 30 according to the present invention.

Since the performance limits due to flow separation and/or cavitation are critical only at the maximum positive and minimum negative pitch angle settings, it is of minimal consequence that the values of the parameters h/s and a/c depart from the optimal values described hereinabove at other pitch angle settings of plurality of blades 38 of the first and second blade rows 42, 44.

It is to be recognized that embodiments other than as described hereinabove are within the scope of the present invention. As shown in the embodiment described in FIGS. 3 and 4, the plurality of blades 38 of the first and second blade rows 42, 44 were pivotally attached to the rotatable hub 36 by means of the pivotal attaching means 40 affixed at the center of the blade chords 46. It is also possible to affix the pivotal attaching means 40 at points along the blade chords 46 of the plurality of blades 38 of the first and second blade rows 42, 44 which are off-set from the center of the blade chord 46 so that non-symmetrical flat-plate blades 38 are defined. Establishing off-center pivot points for the plurality of blades 38 gives flexibility in determining desirable values for a and h, and thus for parameters h/s and a/c.

Figure 5:
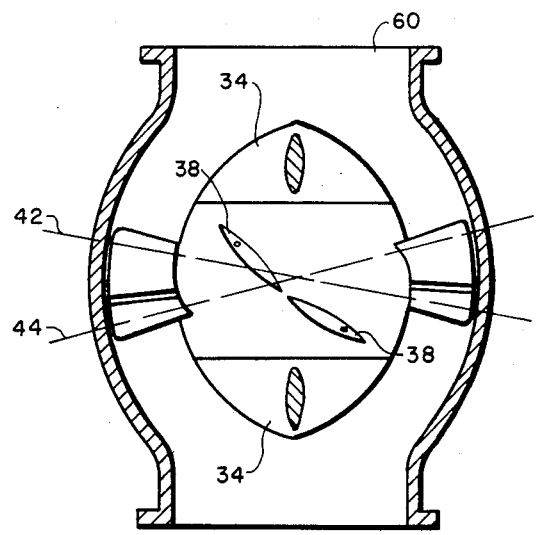
FIG. 5 is a cross sectional view of a variable pitch, variable camber offset multiple flat-plate blade row bidirectional thrust or flow device with a spherical casing according to the present invention.

Another possible embodiment, shown in FIG. 5, within the scope of the present invention is to dispose the bidirectional thrust or flow device 30 in a spherical casing, rather than the cylindrical casing 32 described hereinabove. By making the outer and hub contours of the casing spherical rather than cylindrical, constant blade tip-casing clearances are provided for all pitch angle settings.

Yet another embodiment within the scope of the present invention is to employ stationary, as opposed to rotating, blade rows 42, 44. Stationary blade row support means would, in this embodiment, replace the non-flow interfering stationary hubs 34, guide vane struts 35, and rotating hub 36 of FIG. 2. For stator row configurations, mating of blade pairs would take place in a similar manner to that shown in FIG. 3. Geometries may in certain cases, however, be required to give exiting flows with zero turning. Such a geometry would require that $+\theta_{42}$ or $+\theta_{44}$ be held fixed at 90 degrees, with the other row $\theta$ angles varied through the 90 degree position to mate each blade with either of its two neighbors in the downstream row. Thus, angles for the adjustable upstream row would pivot between 90 degrees plus or minus a maximum adjustment angle. Adjustment of stator blade angles could be accomplished either by a hub-mounted mechanism similar to rotor blade actuators, or by an outer casing-installed mechanism.

The bidirectional thrust or flow device of the present invention as described hereinabove provides improved capabilities for rotating blade rows having flat-plate geometry and adjustable pitch angles. The bidirectional thrust or flow device according to the present invention permits higher shaft and blade tip speeds since flow incidence angles, which limit performance due to their direct influence on cavitation, are reduced.

A further advantage of the bidirectional thrust or flow device according to the present invention is the reduction in size of the device through the increase in total flow turning angle. The blade row design according to the present invention reduces the tendency for stalling or flow separation since flow incidence angles are effectively divided by multiple blade rows, and boundary layer energization is provided to the fluid flow over the leading portion of each trailing row.

Obviously, numerous modifications and variations of the present invention are possible in light of the above teachings. It is therefore to be understood that within the scope of the appended claims, the present invention may be practiced otherwise than as specifically described hereinabove.

What is claimed is:

1. A bidirectional thrust or flow device, comprising:
a casing;
support means disposed within said casing;
a first plurality of uncambered blades defining a first blade row;
first pivotal attaching means cooperating with each of said first plurality of uncambered blades for pivotally attaching said first plurality of uncambered blades to said support means;
at least a second plurality of uncambered blades defining at least a second blade row;
pivotal attaching means cooperating with each of said at least a second plurality of uncambered blades for pivotally attaching said at least said second plurality of uncambered blades to said support means and wherein said pivotal attaching means are tangentially offset from said first pivotal attaching means so that said first blade row is offset from said at least said second blade row; and
means cooperating with said first pivotal attaching means and said pivotal attaching means for pivoting said first plurality of uncambered blades and said at least said second plurality of uncambered blades respectively, said first plurality of uncambered blades pivotable over a first pitch angle range from a maximum (positive) pitch angle through a minimum (negative) pitch angle and said at least said second plurality of uncambered blades pivotable over a second pitch angle range from a maximum (positive) pitch angle through a minimum (negative) pitch angle, and wherein
said maximum (positive) pitch angle and said minimum (negative) pitch angle of said first pitch angle range do not equal said maximum (positive) pitch angle and said minimum (negative) pitch angle of said second pitch angle range, and wherein
any non-zero intermediate pitch angle setting of said first pitch angle range does not equal any intermediate pitch angle setting of said said second pitch angle range, and wherein
a first predetermined pitch angle setting in said first pitch angle range and a second predetermined pitch angle setting in said second pitch angle range causes each of said first plurality of uncambered blades to be aligned with a respective blade of said at least said second plurality of blades to define an energization slot therebetween, and wherein
said each of said first plurality of uncambered blades aligned with said respective blade of said at least said second plurality of blades in combination form a cambered blade configuration, whereby
a total flow turning angle of said bidirectional thrust or flow device is equal to an incidence angle of a working fluid and an absolute magnitude of a difference between said first and predetermined pitch angle setting and said second predetermined pitch angle setting.

2. The bidirectional thrust or flow device according to claim 1 wherein said support means further comprises stationary support means.

3. The bidirectional thrust or flow device according to claim 1 wherein said support means further comprises:
a plurality of non-flow interfering hubs rigidly secured to said casing; and
a rotatable hub cooperating with said plurality of non-flow interfering hubs for rotation with respect thereto; and wherein
said first pivotal attaching means and said pivotal attaching means pivotally attach said first plurality of uncambered blades and said at least a second plurality of uncambered blades to said rotatable hub.

4. The bidirectional thrust or flow device according to claim 1 wherein said at least a second plurality of uncambered blades further comprises a second plurality of uncambered blades defining a second blade row.

5. The bidirectional thrust or flow device according to claim 1 further comprising:
a predetermined tangential spacing s between each adjacent blade of said first plurality of uncambered blades and each adjacent blade of said at least said second plurality of blades; and wherein
each of said first plurality of uncambered blades and each of said at least said second plurality of blades has a chord line c, and wherein
said energization slot further comprises,
an axial blade edge separation a between a leading edge of each of said first plurality of uncambered blades and a trailing edge of each of said at least said second plurality of blades, and
a tangential blade edge separation h defined by a line tangentially extending from said leading edge of each of said first plurality of uncambered blades to an extension of each said chord line c of each of said at least said second plurality of blades, whereby
a first parameter h/s is defined and a second parameter a/c is defined.

6. The bidirectional thrust or flow device according to claim 4 further comprising:
a predetermined tangential spacing s between each adjacent blade of said first plurality of uncambered blades and each adjacent blade of said second plurality of uncambered blades; and wherein
each of said first plurality of uncambered blades and each of said second plurality of blades has a chord line c, and wherein
said energization slot further comprises,
an axial blade edge separation a between a leading edge of each of said first plurality of uncambered blades and a trailing edge of each of said second plurality of blades, and
a tangential blade edge separation h defined by a line tangentially extending from said leading edge of each of said first plurality of uncambered blades to an extension of each said chord line c of each of said second plurality of blades, whereby
a first parameter h/s is defined and a second parameter a/c is defined.

7. The bidirectional thrust or flow device according to claim 5 wherein said first parameter h/s is a value in the range of approximately 0.20 to 0.15 and said second parameter a/c is a very small value close to zero.

8. The bidirectional thrust or flow device according to claim 6 wherein said first parameter h/s is a value in the range of approximately 0.20 to 0.15 and said second parameter a/c is a very small value close to zero.

9. The bidirectional thrust or flow device according to claim 5 wherein each of said first pivotal attaching means is rigidly secured to a respective one of said first plurality of uncambered blades at the midpoint of said chord line c thereof, and each of said pivotal attaching means is rigidly secured to a respective one of said at least said second plurality of uncambered blades at the midpoint of said chord line c thereof.

10. The bidirectional thrust or flow device according to claim 5 wherein each of said first pivotal attaching means is rigidly secured to a respective one of said first plurality of uncambered blades at a first predetermined point on said chord line c thereof offset form the midpoint, and each of said pivotal attaching means is rigidly secured to a respective one of at least said second plurality of uncambered blades at a second predetermined point on said chord line c thereof offset from the midpoint.

11. The bidirectional thrust or flow device according to claim 1 wherein said casing further comprises a cylindrical casing.

12. The bidirectional thrust or flow device according to claim 1 wherein said casing further comprises a spherical casing.

* * * * *